(12) United States Patent
Mayne

(10) Patent No.: US 7,216,748 B2
(45) Date of Patent: May 15, 2007

(54) METHOD AND APPARATUS FOR RELEASING TORQUE ON A DRIVETRAIN

(76) Inventor: Jody G. Mayne, 1585 CR 1224, Grand Saline, TX (US) 75140

( * ) Notice: Subject to any disclaimer, the term of this patent is extended or adjusted under 35 U.S.C. 154(b) by 123 days.

(21) Appl. No.: 11/090,648

(22) Filed: Mar. 25, 2005

(65) Prior Publication Data

US 2006/0213712 A1    Sep. 28, 2006

(51) Int. Cl.
*F16D 47/04* (2006.01)
*F16D 15/00* (2006.01)
*F16D 41/06* (2006.01)
*F16D 11/00* (2006.01)

(52) U.S. Cl. .................. 192/48.6; 192/45.1; 192/53.1; 192/47; 192/114 T; 180/292; 180/293; 180/294

(58) Field of Classification Search ............... 180/292, 180/293, 294; 192/12 B, 48.6, 53.1, 45.1, 192/47, 114 R, 114 T
See application file for complete search history.

(56) References Cited

U.S. PATENT DOCUMENTS

| | | | | |
|---|---|---|---|---|
| 1,960,559 A | * | 5/1934 | Thompson | 192/48.6 |
| 2,624,436 A | * | 1/1953 | Gamble | 192/45.1 |
| 2,912,086 A | * | 11/1959 | Troendly et al. | 192/45.1 |
| 3,066,778 A | * | 12/1962 | Maurer | 192/45.1 |
| 3,991,488 A | * | 11/1976 | Valentine | 434/314 |
| 5,030,179 A | * | 7/1991 | Ganoung | 475/50 |
| 5,966,989 A | * | 10/1999 | Reed et al. | 74/331 |
| 6,307,277 B1 | * | 10/2001 | Tamai et al. | 290/40 C |
| 2003/0010592 A1 | * | 1/2003 | Miura et al. | 192/45.1 |
| 2003/0139246 A1 | * | 7/2003 | Sugiura et al. | 475/279 |

* cited by examiner

*Primary Examiner*—Christopher P. Ellis
*Assistant Examiner*—John R. Olszewski
(74) *Attorney, Agent, or Firm*—Christopher Wood; Wood & Eisenberg, PLLC

(57) ABSTRACT

The present invention is a drivetrain that prevents the torque from a decelerating engine from being transmitted to the wheels of the vehicle. The drivetrain of a vehicle is provided such that the negative torque from the decelerating engine of the vehicle is selectively prevented from being transmitted to the wheels of the vehicle.

15 Claims, 3 Drawing Sheets

METHOD AND APPARATUS FOR RELEASING TORQUE ON A DRIVETRAIN

BACKGROUND OF THE INVENTION

1. Technical Field

The present invention relates to the field of vehicles and more particularly to the drivetrain of vehicles.

2. Description of Related Art

An automotive vehicle employing an internal combustion engine generally uses a throttle to control the acceleration of the vehicle. In most vehicles when the engine is throttled up, the rate of delivery of power supplied by the engine is increased causing an increase in force transmitted through the drivetrain to the wheels of the vehicle causing the vehicle to accelerate. Alternatively when the engine is throttled down, a reduction in force is transmitted through the drivetrain to the wheels of the vehicle causing deceleration at least in part due to engine braking.

Engine braking is known to negatively affect the vehicle's drivetrain and can be a significant force and stress to the engine. It not only causes stress in the drivetrain components by subjecting them to forces in a direction opposite to that for which they may have been engineered, but engine braking may also reduce the stability of the vehicle among other negative consequences. Particularly with high-compression, large displacement four-stroke racing engines, the detriments caused by engine braking are appreciated by those skilled in the art.

For example when a vehicle is racing particularly on a track, the vehicle is subject to abrupt downshifting at high speeds upon approaching and entering a corner or curve of the track. The abrupt downshifting is typically executed before entering the turn. This is done to preclude upsetting the balance of the vehicle caused by depressing and releasing the clutch for a lower gear while turning. Downshifting allows the vehicle to have power by being in a lower gear as soon as possible to exit the turn.

However, this creates a problem when exiting the turn because unless the driver has revved the engine while the clutch is depressed, releasing the clutch after shifting to the lower gear will cause the torque from the decelerating engine to be transmitted to the rear wheels. Such an action may tend to cause the rear wheels to briefly lock up and will have the effect of additional braking from the rear wheels. This can be very upsetting to the balance of the car particularly if it occurs in a turn and may cause the driver to loose control.

One technique used to try and eliminate these problems is heel-and-toe braking. Heel-and-toe braking is when the driver manipulates the throttle and the brake at the same time with the right foot. The idea is that when entering a turn and downshifting at the same time, the revolutions of the engine should be to deter having the driving wheels lock up and/or lose traction. Heel-and-toe braking allows the driver to brake, shift, and set up for the turn, all without locking up the tires or offsetting the vehicle's balance. However heel-and-toe braking is difficult to master. For example, when too little throttle is applied, the nose of the vehicle will dive once the clutch is released, causing an oversteer situation or, in the case of the front wheels locking, an understeer situation. If too much throttle is applied, the vehicle will accelerate towards the turn, causing the entrance of the turn to be missed.

What is needed is an apparatus that can easily be attached to a vehicle to prevent torque from a decelerating engine from being transmitted to the wheels of the vehicle and prevent upsetting the vehicle's balance when downshifting. The apparatus should be easy to install, not harm the vehicle, or cause excessive wear on the vehicle. It would be beneficial if the apparatus could be relatively easy to engage or disengage.

SUMMARY OF THE INVENTION

The present invention is a drivetrain that prevents the negative torque from a decelerating engine from being transmitted to the wheels of the vehicle. The drivetrain includes a sprag bearing or one-way clutch attached to the crank shaft or located in the transmission.

If the sprag bearing is located on the crank shaft, the sprag bearing connects the crank shaft to the input shaft of the transmission. When the engine is throttled up, the force is allowed to be transmitted from the crank shaft to the input shaft and then to the transmission and to the remaining drivetrain. However, when the engine is throttled down for deceleration, the sprag bearing does not allow the torque from the reduced force to be transmitted from the crank shaft to the input shaft and the input shaft is free to overrun the crank shaft and the vehicle does not experience engine braking.

Similarly, if the sprag bearing is located in the vehicle's transmission, the force from the engine throttling up is allow to be transmitted to the drive shaft but the negative torque from a decelerating engine not allowed to be transmitted to the drive shaft. The location in the transmission may be such that the torque from a decelerating engine is prevented from being transmitted to the drive shaft only when the vehicle is in the highest gear.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
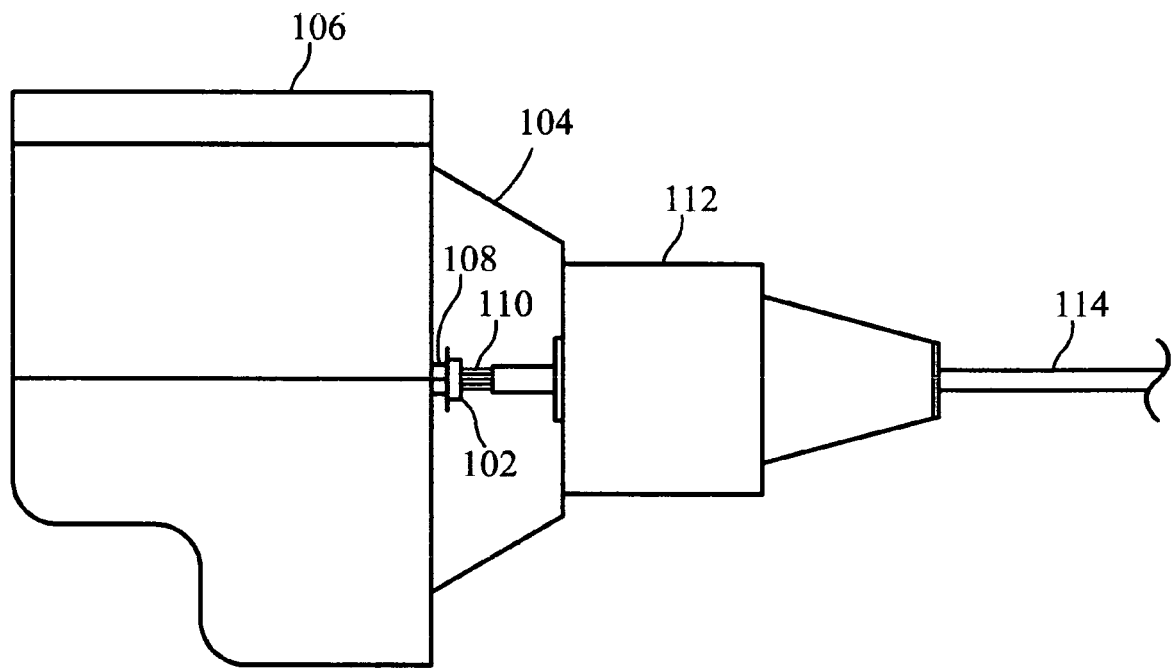
FIG. 1 is a simplified view of a portion of the drivetrain of the present invention.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

FIG. 1 shows a simplified view of sprag bearing 102 installed on the drivetrain of a vehicle. Preferably, the vehicle has a manual transmission for use in the sport of racing and, more preferably, for racing on dirt tracks. The drivetrain consists of engine 106, crank shaft 108, input shaft 110, bell housing 104, transmission 112, and drive shaft 114. Sprag bearing 102 is located between engine 106 and transmission 112 and operationally connects crank shaft 108 and input shaft 110.

Figure 2:
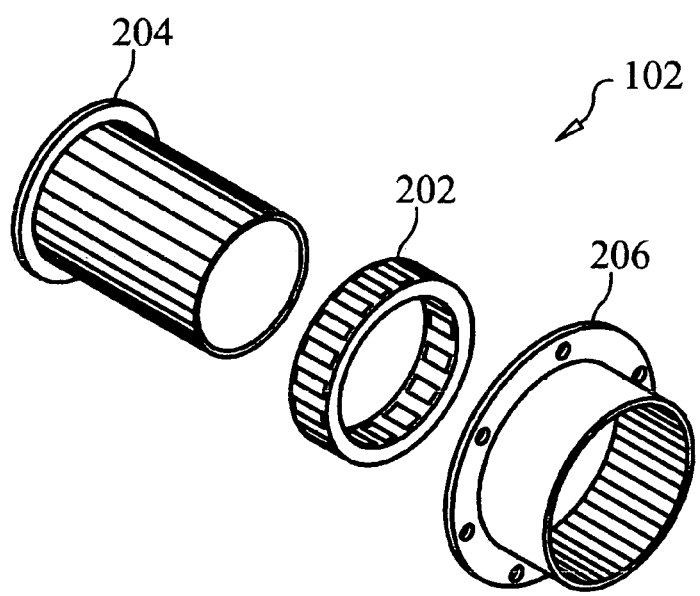
FIG. 2 is an exploded view of a sprag bearing for use in the present invention.
Figure 3:
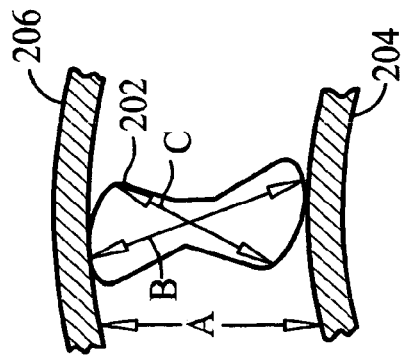
FIG. 3 is a plan view of a sprag for use in the present invention.

As shown in FIG. 2, sprag bearing 102 has a plurality of sprags 202 positioned in an annular space between concentric inner race 204 and concentric outer race 206. As shown in FIG. 3, each sprag 202 is designed with a geometry that makes its two diagonals, diagonals B and C of different length. Distance A is the distance between inner race 204 and outer race 206. Diagonal B is longer than distance A, while diagonal C is shorter than distance A.

Because of this configuration, one direction of relative rotation between the races causes sprags 202 to rotate so that the longest diagonal, diagonal B, is in contact with inner race 204 and outer race 206. Because the length of diagonal B is greater than the distance between inner race 204 and outer race 206 (distance A), sprags 202 are wedged between inner race 204 and outer race 206 providing a solid connection for the transmission of torque from the crank shaft 108 to the input shaft 110.

Relative rotation between the races in the opposite direction causes sprags 202 to rotate so that the shortest diagonal, diagonal C, is in contact with inner race 204 and outer race 206. The length of diagonal C is less the distance between inner race 204 and outer race 206, (distance A). At a certain angular velocity, the centrifugal force acting on sprags 202 reaches a level that causes sprags 202 to pivot about an axis of rotation such that a clearance develops between sprags 202 and outer race 206. The clearance removes the torque coupling between inner race 204 and outer race 206 such that torque is not transmitted from crank shaft 108 to input shaft 110 leaving input shaft 110 free to overrun crank shaft 108.

In use, when engine 106 is throttled up for acceleration, the force is transmitted from engine 106 to crank shaft 108. Crank shaft 108 transmits the force to sprag bearing 102. Sprag bearing 102 is configured such that during engine acceleration, the sprags 202 are wedged between the inner race 204 and outer race 206, providing a solid connection for transmission of torque which transmits the force to input shaft 110. Input shaft 110 transmits the force to transmission 112 which transmits the force to the rest of the drivetrain 114 thereby accelerating the vehicle.

However, when engine 106 is throttled down for deceleration, the reduced force is transmitted from engine 106 to crank shaft 108. Crank shaft 108 transmits the force to sprag bearing 102. Sprag bearing 102 is configured such that a clearance develops between the sprags 202 and outer race 206. The clearance removes the torque coupling between the inner race 204 and outer race 206 and the negative torque is not transmitted to input shaft 110. Input shaft 110 is free to overrun crank shaft 108 and vehicle 104 does not experience engine braking.

Figure 5:
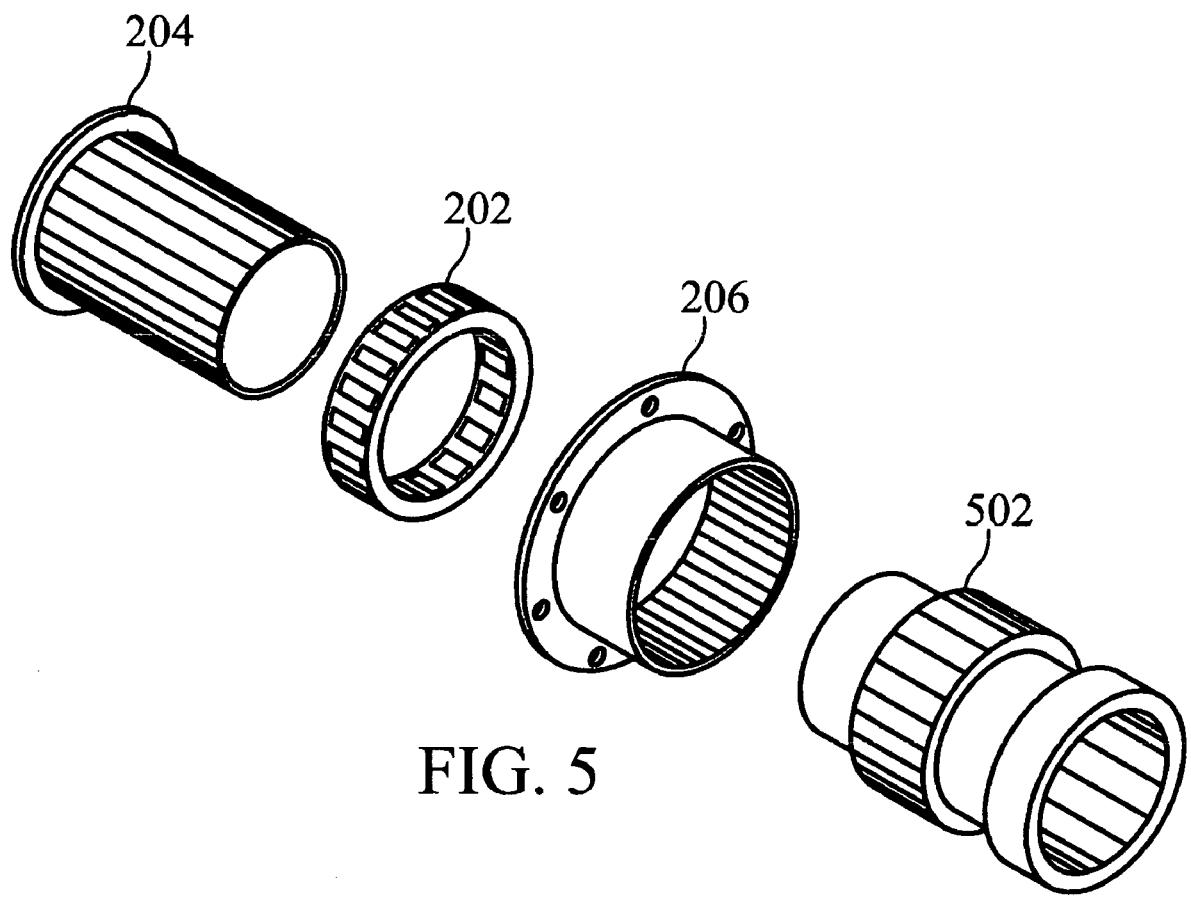
FIG. 5 is an exploded view of a sprag bearing with a locking mechanism for use in the present invention.

In an alternate embodiment, shown in FIG. 5, sprag bearing 102 contains locker gear 502. Locker gear 502 is a splined gear capable of sliding between inner race 204 and outer race 206. Once inserted, locker gear 502 affixes inner race 204 to outer race 206 and prevents them from disengaging. Because inner race 204 and outer race 206 cannot disengage, input shaft 110 is not free to overrun crank shaft 108. Preferably, locker gear 502 is used on a dirt track racing vehicle as racing conditions dictate. Other uses would be apparent to those skilled in the art.

Figure 6:
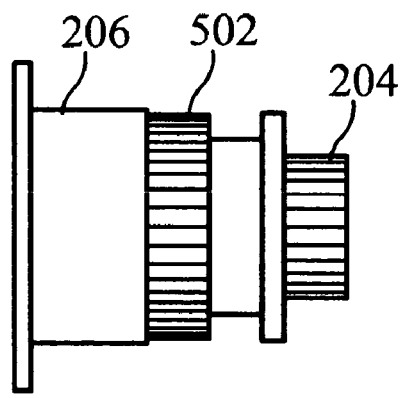
FIG. 6 is a plan view of the locking mechanism is the locked position.

FIG. 6 shows sprag bearing 102 in the locked position wherein locker gear 502 is inserted between inner race 204 and outer race 206 such that inner race 204 is coupled to outer race 206. Because inner race 204 and outer race 206 are coupled together, the input shaft 110 is not allowed to overrun the crank shaft 108.

Figure 7:
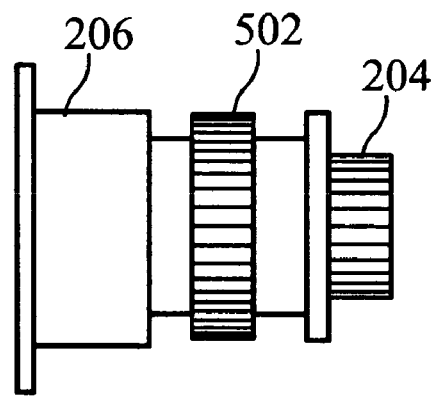
FIG. 7 is a plan view of the locking mechanism in the unlocked position.

FIG. 7 shows sprag bearing 102 in the unlocked position. Locker gear 502 is not inserted between inner race 204 and outer race 206 and inner race 204 is not coupled to outer race 206 except by sprag 202. Because inner race 204 and outer race 206 are connected by sprag 202, the input shaft 110 is allowed to overrun the crank shaft 108.

The locking mechanism is relatively easy to engage and does not require specialized tools. To engage the locking mechanism, locker gear 502 is slid between inner race 204 and outer race 206 such that inner race 204 is coupled to outer race 206. To disengaged the locking mechanism, locker gear 502 is removed by sliding locker gear 502 from between inner race 204 and outer race 206 such that inner race 204 is no longer coupled to outer race 206.

Figure 4:
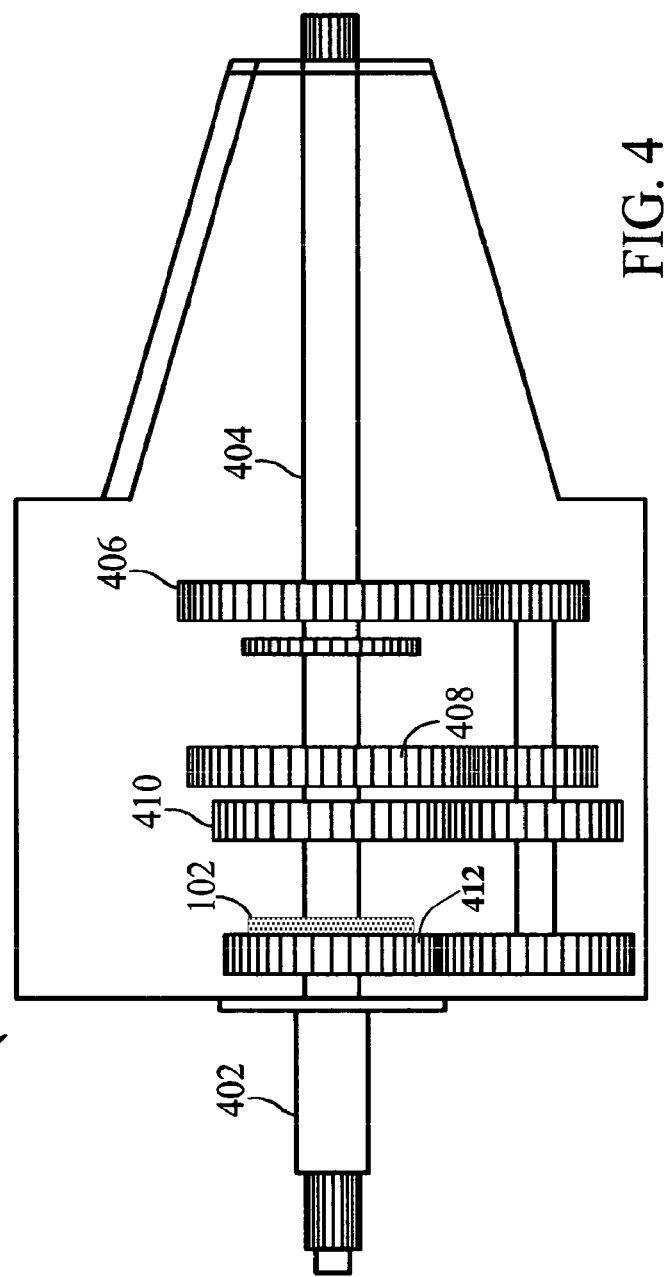
FIG. 4 is a cut away view of one embodiment of a transmission for use in the present invention.

Sprag bearing 102 may be located in other places on the vehicles drivetrain such that it would prevent the torque from a decelerating engine 106 from being transmitted to the vehicle's wheels. For example, as shown in FIG. 4, sprag bearing 102 may be located in transmission 112.

Transmission 112 contains input shaft 402, main shaft 404, first gear 406, second gear 408, third gear 410, and fourth gear 412. Transmission 112 is a typical transmission known in the art. Sprag bearing 102 is inserted into transmission 112 such that main shaft 404 is divided into a first portion and a second portion. First portion contains fourth gear 412 and second portion contains third gear 410, second gear 408, and first gear 406. This allows first gear 406, second gear 408, and third gear 410 to be unaffected by sprag bearing 102.

The torque from a decelerating engine is prevented from being transmitted to the vehicle's wheels only when the vehicle is in fourth gear; the highest gear. If the vehicle is in any other gear besides fourth gear, the torque from the decelerating engine would be transmitted to the wheels.

Sprag bearing 102 may be located in other places within transmission 112. For example, sprag bearing 102 may be located before third gear 410. If sprag bearing 102 is located before third gear 410, then first gear 406 and second gear 408 would be unaffected by sprag bearing 102 and the negative torque from the decelerating engine would be transmitted to the wheels only if the vehicle was in first gear 406 or second gear 408. Sprag bearing 102 may be located almost any other place within transmission 112 so long as sprag bearing 102 is located in front of the reverse gear. If sprag bearing 102 is located behind the reverse gear, then reverse would not work because sprag bearing 102 would not allow the inner race 204 to become coupled to the outer race 206 and the torque from the first portion of the input shaft 402 would not be transmitted to the second portion of input shaft 402.

While transmission 108 is a four speed transmission, other transmissions may be used such as a three or five speed or any other similar transmission.

Installation of sprag bearing 102 into transmission 108 requires modification of transmission 108 such as lengthening the case and components but such modification would be known to one skilled in the art.

Although the invention has been described with reference to one or more preferred embodiments, this description is not to be construed in a limiting sense. There is modification of the disclosed embodiments, as well as alternative embodiments of this invention, which will be apparent to persons of ordinary skill in the art, and the invention shall be viewed as limited only by reference to the following claims. For example, while a sprag bearing has been described, any one-way clutch bearing known may be used and such modification would be apparent to one skilled in the art. Also, if the invention were to be used on vehicles typically used on paved racing tracks, the sprag bearing would be proximate to the fly wheel, clutch plate or transmission.

I claim:

1. A drivetrain on a vehicle whereby the vehicle has wheels and the drivetrain prevents the torque from a decelerating engine on the vehicle from being transmitted to the wheels of the vehicle, the drivetrain comprising:
    an engine;
    a crankshaft operationally connected to the engine;
    an input shaft operationally connected to a transmission, wherein said transmission comprises:
        a main shaft, and
        first gear, second gear, third gear and a fourth gear, wherein the first, second, third and fourth gears are located on the main shaft; and
    a one-way clutch connecting the crankshaft to the input shaft such that the input shaft can overrun the crankshaft.

2. The drivetrain of claim 1 wherein the one-way clutch is a sprag bearing.

3. The drivetrain of claim 1 wherein the one-way clutch can be selectively locked by a locking mechanism such that torque from a decelerating engine is transmitted to the vehicle wheels.

4. The drivetrain of claim 3 wherein the locking mechanism is splined.

5. The drivetrain of claim 4 wherein the one-way clutch is a sprag bearing with an inner race and an outer race and the locking mechanism is slid between the inner and race and the outer race.

6. The drivetrain of claim 1 wherein the transmission is a manual transmission.

7. The drivetrain of claim 1 wherein the vehicle is a vehicle used for dirt track racing.

8. A method of preventing the torque from a decelerating engine in a vehicle from being transmitted to the wheels of the vehicle, the method comprising the steps of:
    accessing a crankshaft on the vehicle;
    attaching a one-way clutch to the crankshaft;
    accessing the input shaft on the vehicle; and
    attaching the input shaft to the one-way clutch such that the torque from the decelerating engine in the vehicle is not transmitted to the vehicle's wheels,
    wherein the one-way clutch can be locked by a locking mechanism such that the torque from a decelerating engine can be transmitted to the vehicles wheels, and
    wherein the locking mechanism is splined.

9. A method of preventing the torque from a decelerating engine in a vehicle from being transmitted to the wheels of the vehicle, the method comprising the steps of:
    accessing a crankshaft on the vehicle;
    attaching a one-way clutch to the crankshaft;
    accessing the input shaft on the vehicle; and
    attaching the input shaft to the one-way clutch such that the torque from the decelerating engine in the vehicle is not transmitted to the vehicle's wheels,
    wherein the one-way clutch can be locked by a locking mechanism such that the torque from a decelerating engine can be transmitted to the vehicle's wheels,
    wherein the locking mechanism is splined, and
    wherein the one-way clutch is a sprag bearing with an inner race and an outer race and the locking mechanism is slid between the inner race and outer race.

10. A drivetrain on a vehicle wherein the vehicle has wheels and the drivetrain prevents the torque from a decelerating engine in the vehicle from being transmitted to the wheels, the drivetrain comprising:
    an engine;
    a transmission operationally connected to the engine whereby the transmission contains a main shaft and at least two gears including a fourth, third, second and first gear located on the main shaft;
    a drive shaft operationally connected to the transmission;
    wheels operationally connected to the drive shaft; and
    a one-way clutch located on the main shaft between the fourth and third gears on the main shaft and dividing the main shaft into a first and second portion such that the second portion is allowed to outrun the first portion of the main shaft, and wherein the fourth gear is located on the second portion of the main shaft and the third, second and first gears are located on the first portion of the main shaft.

11. The drivetrain of claim 10 wherein one of the at least two gears is a reverse gear.

12. The drivetrain of claim 11 whereby the second portion contains a reverse gear.

13. The drivetrain of claim 10 wherein the vehicle is a track racing vehicle.

14. A drivetrain on a vehicle whereby the vehicle has wheels and the drivetrain prevents the torque from a decelerating engine on the vehicle from being transmitted to the wheels, the drivetrain comprising:
    an engine;
    a crankshaft operationally connected to the engine;
    an input shaft operationally connected to a transmission; and
    a one-way clutch connecting the crankshaft to the input shaft such that the input shaft can overrun the crankshaft, wherein the one-way clutch can be selectively locked by a locking mechanism such that torque from a decelerating engine is transmitted to the vehicles wheels, and wherein the locking mechanism is splined.

15. A drivetrain on a vehicle whereby the vehicle has wheels and the drivetrain prevents the torque from a decelerating engine on the vehicle from being transmitted to the wheels, the drivetrain comprising:
    an engine;
    a crankshaft operationally connected to the engine;
    an input shaft operationally connected to a transmission; and
    a one-way clutch connecting the crankshaft to the input shaft such that the input shaft can overrun the crankshaft, wherein the one-way clutch can be selectively locked by a locking mechanism such that torque from a decelerating engine is transmitted to the vehicles wheels, wherein the locking mechanism is splined, and wherein the one-way clutch is a sprag bearing with an inner race and an outer race and the locking mechanism is slid between the inner race and the outer race.

* * * * *